Patented July 31, 1951

2,562,162

UNITED STATES PATENT OFFICE 2,562,162

RAZOR BLADE CONDITIONING

Edward J. Gray, New York, N. Y.; Irene Carol Gray executrix of said Edward J. Gray, deceased No Drawing. Application May 14, 1947,
Serial No. 748,117

3 Claims. (Cl. 106—14)

As conducive to a clear understanding of the invention, it is noted that regardless how resistant the blade surface be to corrosion, the more or less porous untreated interior of the blade structure becomes exposed to moisture through the minute splits that break across the thin cutting edge as soon as the blade is put to use. The blade accordingly rusts rapidly due to the entry and lodging of moisture at the splits across the cutting edge, and minute sections of the cutting edge may even break away from the blade with serious impairment in the efficacy of the blade. The honing and stropping of blades between shaves, though it helps to restore the jagged split edge of a used razor blade to a common plane does not overcome the difficulties incurred at the rusted regions of the cutting edge, and is not available even for the limited advantages of that expedient in the case of the magazine type razors now on the market. The rusted areas adjacent the cutting edge also constitute a lodging place for organic substances which may develop bacteria, with danger to the user when the skin becomes scraped, scratched or cut.

It is among the objects of the invention greatly to retard and minimize corrosion of razor blades generally and thereby to obtain a smoother shaving action without irritation to the skin, to prolong the useful life of the blade and to reduce the danger of infection in its use, all without the need for removing the blade from the razor.

The invention involves the use of a composition comprising a plastic substance in a suitable volatile vehicle, preferably a solution, which composition is readily applied to the cutting edge or edges of the blade, whether in or out of the razor, the composition being hydrophobic and of low surface tension so as readily to enter and completely to fill to the exclusion of water therefrom the minutest capillary splits or cracks that break across the cutting edge upon shaving. The volatile solvent promptly evaporates, thereby to leave upon the cutting edge and lodged within the said minute splits or cracks, an apparently dry finely grained film protecting the blade from water, thereby effectively to prevent corrosion and to prevent the above recited consequences of such corrosion.

According to the invention, any of a wide variety of plastic compositions that are soluble in volatile solvents will serve for the purpose.

Among suitable plastics are methacrylates, polystyrenes, vinyl polymers and copolymers, cellulose esters and ethers, and synthetic elastomers. Typical plastics in this group are: cellulose acetate, cellulose acetobutyrates, cellulose nitrate, methyl cellulose acetate and Neoprene.

The plastics mentioned are plasticized with suitable esters. Esters of phosphoric acid such as tricresyl phosphate or of phthalic acid such as dibutyl phthalate or of sebacic acid such as dibutyl sebacate are useful for the purpose.

For 100 parts of the plastic or resin, from 40 to 90 parts by weight of the plasticizer would be used. Specifically, with methacrylates 60 to 90 parts of plasticizer are used; with polystyrenes 50 to 90 parts; with cellulose esters 40 to 90 parts, and with synthetic elastomers 50 to 90 parts.

The solvent for the plasticized plastics above set forth may be acetone or any other ketone solvent such as methyl ethyl ketone or methyl isobutyl ketone in quantity sufficient to make a free flowing liquid solution. Ordinarily 10 to 20 parts by weight of the plasticized plastic is dissolved in 100 parts of the solvent.

In place of the synthetic plastics above mentioned, suitable waxes may be used such as paraffin, carnauba, spermacetti, ozokerite, ceresin or montan wax suitably modified or plasticized with an amorphous wax such as bee's wax or with mineral oil or polybasic acid such as stearin or with polyhydric alcohols such as glycerin. The wax thus modified is carried in a vehicle, preferably a solvent such as alcohol or aliphatic hydrocarbon.

In another type of composition for the purpose, terpenes or derivatives thereof are used. These are of the monocyclic type such as menthol, or of the bicyclic type such as camphor in a suitable solvent such as alcohol. The term "camphor" is intended to define not only the product obtained by the steam distillation of the camphor tree wood twigs and leaves of the camphor tree (*Laurus camphora*) but the similar product synthesized commercially from oil of turpentine, and known as "synthetic camphor."

While in each of the embodiments a solution is preferred, a suspension is suitable in many cases.

In one preferred embodiment, synthetic camphor is dissolved in a suitable solvent such as alcohol, preferably in isopropyl alcohol. For practical use a composition comprising about 10 to 20 per cent by volume of the camphor in 90 to 80 per cent of the alcohol is suitable. In one commercial embodiment, 16 per cent by volume of synthetic camphor is dissolved in 84 per cent of isopropyl alcohol.

By reason of the volatility of the carrier in all of the compositions set forth, the composition should be kept in a tightly sealed bottle, the closure of which desirably bears a suitable applicator such as a brush by which the composition is applied to the cutting edge or edges of the blade, preferably immediately before each shaving operation. The composition is preferably applied to the blade edge while in place in the razor, and is therefore as useful with magazine type razors as with the ordinary type. In use the solvent speedily evaporates with consequent cooling effect, and leaves a deposit of the solute upon the cutting edge which in the case of camphor would be immediately visible to the naked eye. The camphor also has a cooling and healing effect in the shaving operation, and the solvent is of character commonly used in after shaving lotions and so also contributes to shaving comfort. By reason of the low surface tension of the composition as applied to the blade, it not only enters the minute splits and cracks across the cutting edges and the pores thus exposed, to the exclusion of water as above pointed out, but it remains in place therein, and only the deposit of camphor or other plastic on the smooth surface area of the blade could be wiped off, since that which has entered the pores at the splits of the blade stays there and performs its protective function. The film manifestly has a detergent action in such wiping operation. Thus the blade is protected from corrosion at its otherwise unprotected splits or cracks, due for instance to the condensation of moisture thereon, while kept in a cabinet or toilet kit.

Manifestly the composition could be applied to the blade by the manufacturer, thereby to afford protection to new blades prior to their sale.

With the use of the present invention it has been found that the useful life of a blade is multiplied from two to three times; that is, those who can use a blade for only three shaves in ordinary practice would, by the simple application before each shave of the conditioning composition in manner above set forth, are enabled to use the same blade for from six to ten times and each of the greatly increased number of shaves would be quicker and smoother than in the absence of such conditioning treatment.

As many changes could be made in the above method and composition, and many apparently widely different embodiments of the invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. A razor conditioning composition comprising camphor in proportion of about one-sixth by volume dissolved in isopropyl alcohol about five-sixths by volume.

2. The method of conditioning a razor blade which consists in applying to the cutting edge thereof before each use of the blades a liquid composition comprising camphor in a volatile carrier of isopropyl alcohol, whereby upon prompt evaporation of the carrier the camphor remains lodged in the minute splits or cracks formed across the cutting edge after shaving and protects the blade from corrosion.

3. The method of claim 2 in which the isopropyl alcohol carrier of the liquid composition used is about one-sixth by volume thereof and the camphor dissolved therein being about five-sixths by volume of such composition.

EDWARD J. GRAY.

REFERENCES CITED

The following references are of record in the file of this patent:

UNITED STATES PATENTS

| Number | Name | Date |
|---|---|---|
| 1,400,395 | Weinberg | Dec. 13, 1921 |
| 2,348,715 | Steele | May 16, 1944 |
| 2,379,246 | Muscat | June 26, 1945 |
| 2,402,551 | Holt | June 25, 1946 |

FOREIGN PATENTS

| Number | Country | Date |
|---|---|---|
| 25,081 | Great Britain | of 1903 |
| 11,679 | Great Britain | of 1905 |
| 248,463 | Great Britain | of 1926 |

OTHER REFERENCES

Pharmacopoeia of U. S. A., 9th ed. (1916), page 406.

Grant et al.: "Isopropyl Alcohol," reprinted from The American Journal of Pharmacy, June 1922, page 5.